Patented Nov. 8, 1949

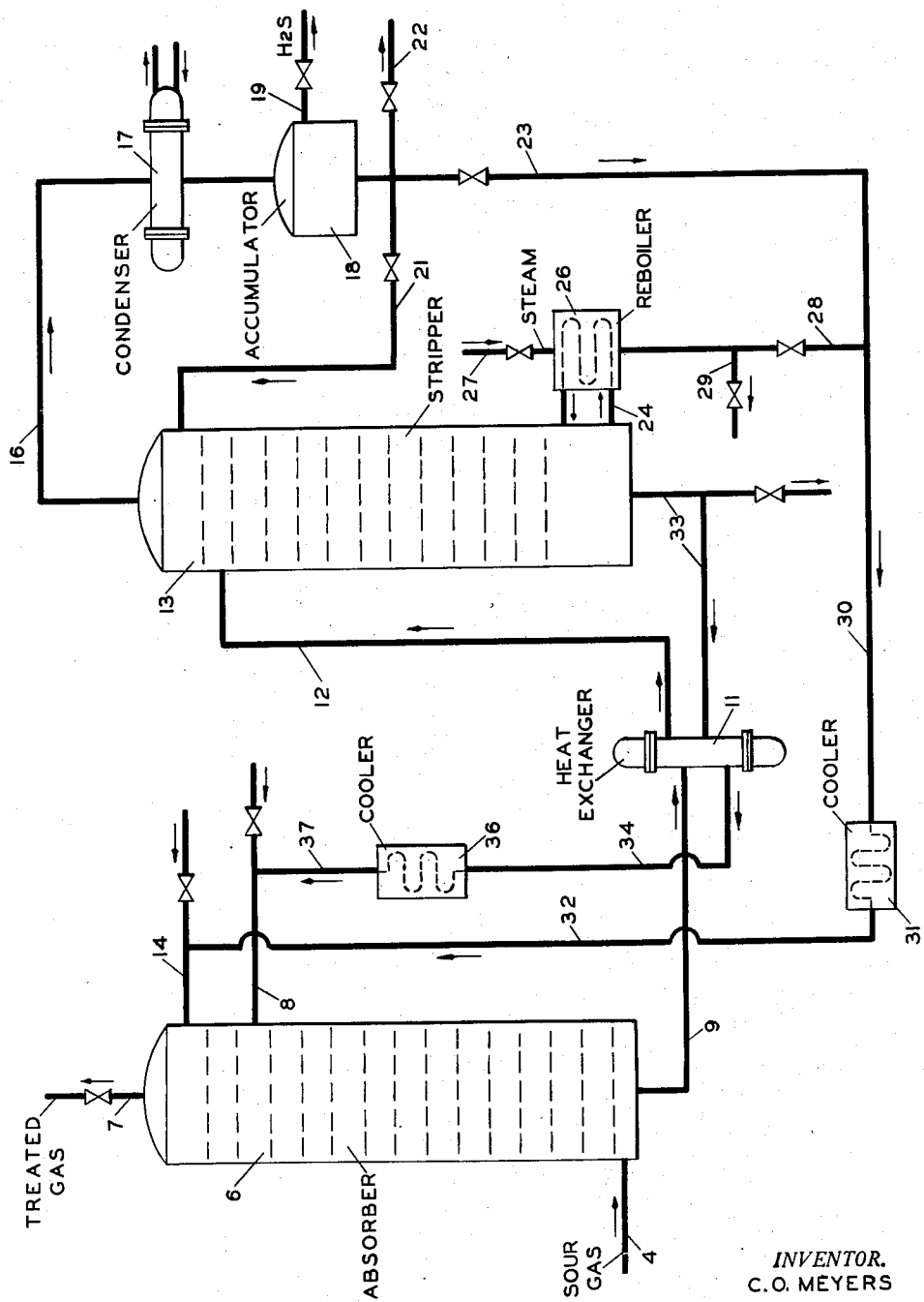

2,487,576

UNITED STATES PATENT OFFICE 2,487,576

PROCESS FOR THE REMOVAL OF ACIDIC MATERIAL FROM A GASEOUS MIXTURE

Charles O. Meyers, Bartlesville, Okla., assignor to Phillips Petroleum Company, a corporation of Delaware Application November 13, 1945, Serial No. 628,309

4 Claims. (Cl. 23—2)

This invention relates to the treatment of fluids containing acidic materials. In one aspect this invention relates to the removal of acidic materials, such as hydrogen sulfide, from gases. In another aspect this invention relates to the prevention of entrainment of the absorption medium in the effluent from an absorption zone.

Many gases used commercially for various purposes contain acidic materials which are detrimental to the use of these gases. Particularly, normally gaseous mixtures containing hydrocarbons, for example natural gas and light gases obtained from various hydrocarbon conversion processes, are used as fuel, as feed to hydrocarbon conversion processes, and in the production of carbon black. Acidic impurities, such as hydrogen sulfide, sulfur dioxide and carbon dioxide, contained in these gases often interfere with chemical reactions in which the gases are involved as well as being injurious to the equipment which the gases contact. The detrimental effect of the acidic impurities necessitates their removal from the gases. These acidic materials may be removed and recovered from gases as valuable products, especially hydrogen sulfide which may be used to produce sulfuric acid, and carbon dioxide which may be used in the manufacture of carbon monoxide. From an olfactory aspect it is also desirable in many cases to remove the acidic materials from gases vented to the atmosphere, such as flue gases and waste refinery gases.

Generally fluids containing these acidic impurities are treated by contacting the fluids, either in the liquid or vapor phase, with a suitable absorption medium to remove the undesirable impurities. Gases containing the impurities are passed into the lower portion of an absorption column to contact a down-flowing liquid absorption medium. The gaseous effluent removed from the upper portion of the column is substantially free from the acidic impurities. The absorption medium is passed from the absorption column to a stripping or rectifying zone for removal of the acidic impurities from the absorption medium. The rectified absorption medium may then be recycled to the absorption column. Commonly in these absorption processes for purifying gases, some of the absorption medium is entrained in the gaseous effluent. The entrained absorption medium passing to subsequent processes and equipment with the treated effluent may often be detrimental to these processes and equipment since they may interfere with chemical reactions if involved, or cause corrosion and plugging of the subsequent equipment. Entrainment of the absorption medium also constitutes a substantial loss of material. Consequently, it is highly desirable to provide a method for preventing the entrainment of the absorption medium in the effluent gases from such absorption processes.

An object of this invention is to remove acidic materials from fluids containing the same.

It is also an object of this invention to remove hydrogen sulfide from low-boiling hydrocarbon mixtures containing the same.

Still another object of this invention is to prevent the entrainment of an absorption medium in the effluent from an absorption process.

Yet another object is to minimize the loss of absorption medium used in the absorption of undesirable impurities from a gaseous stream.

It is still a further object to prevent the corrosion and plugging of subsequent equipment following an absorption process by preventing or minimizing the entrainment of the absorption medium in the effluent.

Further objects and advantages of the present invention will become apparent to those skilled in the art from the following description and disclosure.

According to this invention a fluid containing acidic materials is passed to an absorption zone and is contacted with a suitable absorption medium to remove the acidic materials. In a preferred modification of this invention a gaseous stream containing acidic materials is introduced into the lower portion of an absorption column wherein it passes upward countercurrently to a downflowing liquid aqueous absorption medium. Both the aqueous absorption medium is introduced and the treated effluent is removed from the upper portion of the column. To prevent the entrainment of substantial portions of the liquid absorption medium in the effluent gases, water is introduced above the point of introduction of the absorption medium. The water washes the effluent gases and dissolves or otherwise removes the absorption medium from the gases. The water then flows downward through the absorption column commingling with the absorption medium therein. Enriched absorption medium is removed as a liquid from the lower portion of the absorption column and passes to the upper portion of a stripping or rectifying column. In the stripping or rectifying column the acidic materials in the absorption medium are desorbed therefrom and are passed as a gaseous effluent from the upper portion of the rectifying column. Liquid absorption medium is withdrawn from the lower portion of the rectifying column and recycled to the absorption column.

By liquid absorption medium as used in the present specification is meant any liquid medium which will remove acidic materials from the fluid to be treated by either solubility of the acidic materials therein or by chemical combination therewith.

The preferred application of the present invention is in the removal of hydrogen sulfide from a gaseous hydrocarbon stream by contact with a suitable absorption medium. Absorption mediums suitable for the removal of hydrogen sulfide, carbon dioxide, and other acidic gases comprise aqueous solutions of organic bases, such as monoethanolamine, diethanolamine, triethanolamine. diethanolamine-diethylene glycol, sodium phenolate; and aqueous solutions of sodium thioarsenate, sodium carbonate, tripotassium phosphate, sodium and potassium alcoholates, and an alkali metal or an alkali earth hydroxide which may be in admixture with suitable solventizers such as morpholine, nitromethane, copal, polyalkylenes and polyamines. Since the absorption medium is usually an aqueous solution, the introduction of water into the absorption zone to prevent the entrainment of the absorption medium results in a dilution of the absorption medium. The absorption medium is concentrated in the stripping or rectifying zone, i. e., the excess water is removed as a vapor with the acidic materials from the upper portiton of the stripping zone.

In the preferred embodiment of the present invention a liquid aqueous absorption medium is used in combination with water to prevent entrainment as previously described. The fluid to be treated in the absorption zone may be in either the vapor or the liquid phase. In case the fluid is a liquid, such as a liquid hydrocarbon stream, a liquid stream is passed upward through the absorption zone countercurrent with the downward flow of the liquid absorption medium. However, introduction of the fluid as a vapor is preferred.

The drawing diagrammatically represents an arrangement of apparatus for carrying out the process of this invention to be described more fully hereinafter. In order that this invention may be clearly understood and its applicability realized, a brief description of a process for the removal of hydrogen sulfide from a gaseous hydrocarbon stream by contact with an amine solution will be made. A hydrocarbon stream such as natural gas containing hydrogen sulfide in an amount between about 2 to about 2000 grains per 100 cu. ft. of gas (standard conditions) is passed to absorber 6 through line 4. The hydrocarbon stream passes upward through baffles, trays, or packing in absorber 6 countercurrent to a downflowing amine solution. A hydrocarbon stream substantially free from hydrogen sulfide and any other acidic material is removed from absorber 6 through line 7. The hydrogen sulfide of the effluent hydrocarbon stream is below about 1½ grains and may be as low as about 0.02 grain per 100 cubic feet of gas. A liquid aqueous amine solution is introduced into the upper portion of absorber 6 through line 8. A typical aqueous amine solution may comprise a solution of 15 per cent monoethanolamine. The enriched amine solution is removed from absorber 6 and passed to heat exchanger 11 through line 9 and thence through line 12 to stripper 13. In order to prevent the entrainment of the amine solution in the upward-flowing gases in absorber 6, water is introduced into the upper portion of absorber 6 above the introduction of the amine solution through line 14, as shown.

The water introduced in the upper portion of the absorption column to prevent entrainment should be present in an amount sufficient to maintain a liquid level on the trays which are above the introduction of the liquid absorption medium. Generally, the rate of introduction of water to substantially prevent entrainment of the amine solution is between about 1 and about 5 per cent of the total quantity of liquid absorption medium being introduced per unit of time into the absorption column. When using an amine solution as the absorption medium, the rate of introduction of water is between about 1 and about 3 per cent of the amine solution being introduced per unit of time into the absorption column.

Suitable temperatures and pressures are maintained in absorber 6 to assure removal of substantially all of the hydrogen sulfide from the hydrocarbon stream by absorption. The pressure within absorber 6 corresponds generally to the pressure available on the incoming hydrocarbon stream. A temperature is maintained in absorber 6 above the dew point of the hydrocarbon stream being treated. In general the temperature is maintained between about 60 to about 150° F. and a pressure is maintained between atmospheric and about 800 pounds per square inch gage.

Hydrogen sulfide and other acidic materials dissolved in the enriched liquid amine solution is desorbed in stripper 13. Excess water in the amine solution is vaporized and the hydrogen sulfide and the water vapor pass overhead from stripper 13 through line 16 and condenser 17 to accumulator 18. Water vapor is condensed in condenser 17 and the resulting condensate, which, being in contact with uncondensed gaseous hydrogen sulfide, is a dilute aqueous solution of hydrogen sulfide, is collected in the lower portion of accumulator 18. Hydrogen sulfide and other gases are vented from the system through line 19. A portion or all of the condensate in accumulator 18 may be passed through line 21 to the upper portion of stripper 13 as reflux therefor. Liquid amine solution, substantially free from hydrogen sulfide and excess water, accumulates in the lower portion of stripper 13. A portion of this liquid amine solution is passed through line 24 to reboiler 26 and recycled to the lower portion of stripper 13. Steam is introduced into reboiler 26 through line 27. The rectified amine solution is withdrawn from stripper 13 through line 33 and recycled to absorber 6 through heat exchanger 11, line 34, cooler 36, line 37, and line 8.

Generally a temperature between about 200 and about 300° F. and a pressure between about atmospheric and about 30 pounds per square inch gage are maintained in stripper 13. Stripper 13 contains conventional bubble trays, baffles, or packing to assure effective removal of acidic material from the absorption liquid.

In the preferred embodiment of the present invention steam condensate from reboiler 26 comprises a source of water to be introduced into absorber 6 through line 14. Condensate is removed from reboiler 26 and passed through line 28, line 30, cooler 31, line 32, and line 14 to absorber 6. Excess condensate may be withdrawn from the system through line 29 if necessary.

When a small amount of hydrogen sulfide is permissible in the effluent from absorber 6, an alternative method for supplying the aqueous solution to the upper portion of absorber 6 comprises passing hydrogen sulfide-contaminated condensate from accumulator 18 through line 23, line 30, cooler 31, line 32, and line 14 to absorber 6. Excess condensate from accumulator 18 may be removed from the system through line 22. If the quantity of condensate from either line 26 or accumulator 18 is insufficient to supply the necessary liquid to the upper portion of absorber 6, the two streams from reboiler 26 and accumulator 18 may be combined, or additional water may be introduced through line 14.

For convenience and clarity certain apparatus, such as pumps, surge tanks, accumulators, etc., have not been shown in the drawing. Obviously certain modifications of the present invention may be practiced without departing from the scope of the invention. In particular, the construction of the absorber 6 above line 8 may be substantially different from the construction of the absorber below line 8. For example, the section of the column above line 8 which is used to prevent entrainment of the absorption medium may be packed with suitable contact materials rather than trays. It is only essential that the upper portion of absorber 6 above line 8 be constructed in such a manner that water from line 14 comes into intimate contact with the upflowing gases and the water flow downward through absorber 6.

I claim:

1. In a process for the removal of acidic material from a gaseous mixture containing the same comprising passing such a gaseous mixture into the lower portion of an absorption zone, passing an aqueous solution of an ethanolamine into the upper portion of said absorption zone, removing a gaseous effluent substantially free from said acidic material from the upper portion of said absorption zone, removing said aqueous ethanolamine enriched with absorbed acidic material from the lower portion of said absorption zone, passing said enriched ethanolamine solution to a stripping zone, heating the lower portion of said stripping zone by indirect contact with steam in a reboiler, removing a gaseous effluent containing acidic material and water vapor from the upper portion of said stripping zone, cooling and condensing said water vapor in said effluent, thereby producing water which is contaminated with said acidic material dissolved therein, recycling a portion of the resulting aqueous condensate to the upper portion of said stripping zone as reflux therefor, withdrawing an aqueous solution of ethanolamine substantially free of said acidic material from the lower portion of said stripping zone, cooling said aqueous ethanolamine from said stripping zone, and passing the same to said absorption zone, the improvement which comprises controlling the steam used for heating in said reboiler so that at least some steam is condensed forming a steam condensate, mixing a further portion of said contaminated aqueous condensate formed by condensation of said water vapor in the overhead effluent from said stripping zone and at least a portion of the steam condensate resulting from said indirect contact of steam with the lower portion of said stripping zone, and passing the resulting mixture to said absorption zone, said condensate mixture being introduced into the upper portion of said absorption zone above the point of introduction by said ethanolamine solution and flowing down and mixing with said aqueous ethanolamine.

2. An improved process for the removal of hydrogen sulfide from a gaseous hydrocarbon mixture containing the same which comprises passing said gaseous mixture into the lower portion of an absorption zone, passing an aqueous solution of monoethanolamine containing about 15 per cent of the amine into the upper portion of said absorption zone, introducing an aqueous condensate mixture from a later step of the process into the upper portion of said absorption zone above the point of introduction of said amine solution and passing same downwardly into said amine solution, removing a gaseous effluent substantially free of said hydrogen sulfide from the upper portion of said absorption zone, removing from the lower portion of said absorption zone the aqueous ethanolamine solution enriched with absorbed hydrogen sulfide and additional water, passing said enriched ethanolamine solution to a stripping zone, heating the lower portion of said stripping zone to a temperature between about 200° and about 300° F. by indirect contact with steam in a reboiler and concomitantly condensing a part of said steam to form water, removing a gaseous effluent containing hydrogen sulfide and water vapor from the upper portion of said stripping zone, cooling and condensing said water vapor in said effluent, thereby forming an aqueous condensate comprising a dilute aqueous solution of hydrogen sulfide, recycling a portion of the resulting aqueous condensate to the upper portion of said stripping zone as reflux therefor, withdrawing from the lower portion of said stripping zone a regenerated aqueous solution of ethanolamine of substantially the original concentration and substantially free of said hydrogen sulfide, cooling said ethanolamine solution to a temperature between about 60° and about 150° F., passing the cooled ethanolamine solution to said absorption zone, admixing a further portion of said aqueous condensate formed by the condensation of said water vapor in the overhead effluent from said stripping zone with at least a portion of said steam condensate resulting from said indirect contact of steam with the lower portion of said stripping zone, cooling said aqueous condensate mixture to a temperature sufficient to maintain a temperature between about 60° and 150° F. in said absorption zone, and passing said aqueous condensate mixture as aforesaid into the upper portion of said absorption zone at a rate of about 1 to 3 per cent of the rate of introduction of said aqueous solution of ethanolamine.

3. In a process for the removal of acidic material from a gaseous mixture containing the same comprising passing such a gaseous mixture into the lower portion of an absorption zone, passing an aqueous absorption liquid for the removal of acidic material from said gaseous mixture into the upper portion of said absorption zone, removing a gaseous effluent substantially free from acidic material from the upper portion of said absorption zone, removing an enriched absorption liquid containing acidic material from the lower portion of said absorption zone, passing said enriched absorption liquid to a stripping zone, heating the lower portion of said stripping zone by indirect contact with steam, removing a gaseous effluent containing acidic material and water vapor from the upper portion of said stripping zone, cooling and condensing water vapor in said effluent, recycling a portion of the resulting aqueous condensate to the upper portion of said stripping zone as reflux therefor, withdrawing an aqueous absorption liquid substantially free from acidic material from the lower portion of said stripping zone, cooling said absorption liquid from said stripping zone, and passing same to said absorption zone, the improvement which comprises passing to the top of said absorption zone a steam condensate, resulting from said indirect contact of steam with the lower portion of said stripping zone, to prevent entrainment of the absorption liquid by said gaseous effluent, said steam condensate being introduced into the upper portion of said absorption zone above the point of introduction of said absorption liquid therein and being substantially the only material introduced to prevent said entrainment.

4. In a process for the removal of acidic material from a gaseous mixture containing the same comprising passing such a gaseous mixture into the lower portion of an absorption zone, passing an aqueous absorption liquid for the removal of acidic material from said gaseous mixture into the upper portion of said absorption zone, removing a gaseous effluent substantially free from acidic material from the upper portion of said absorption zone, removing an enriched absorption liquid containing acidic material from the lower portion of said absorption zone, passing said enriched absorption liquid to a stripping zone, heating the lower portion of said stripping zone by indirect contact with steam, removing a gaseous effluent containing acidic material and water vapor from the upper portion of said stripping zone, cooling and condensing water vapor in said effluent, recycling a portion of the resulting aqueous condensate to the upper portion of said stripping zone as reflux therefor, withdrawing an aqueous absorption liquid substantially free from acidic material from the lower portion of said stripping zone, cooling said absorption liquid from said stripping zone, and passing same to said absorption zone, the improvement which comprises passing to the top of said absorption zone a portion of said resulting aqueous condensate to prevent entrainment of the absorption liquid by said gaseous effluent, said condensate being introduced into the upper portion of said absorption zone above the point of introduction of said absorption liquid therein and being substantially the only material introduced to prevent said entrainment.

CHARLES O. MEYERS.

REFERENCES CITED

The following references are of record in the file of this patent:

UNITED STATES PATENTS

| Number | Name | Date |
|---|---|---|
| Re. 18,958 | Bottoms | Sept. 26, 1933 |
| 2,028,124 | Shaw | Jan. 14, 1936 |
| 2,259,901 | Matherson | Oct. 21, 1941 |
| 2,263,043 | McCormick et al. | Nov. 18, 1941 |
| 2,297,866 | Benedict | Oct. 6, 1942 |
| 2,326,122 | Chalfante et al. | Aug. 10, 1943 |
| 2,395,509 | Shaw | Feb. 26, 1946 |